June 23, 1970  W. W. WOOD, JR  3,516,260

VIBRATING CABLE-LAYING PLOW

Filed Sept. 11, 1967  4 Sheets-Sheet 1

INVENTOR
W. W. WOOD, JR.
BY Leo Stanger
ATTORNEY

June 23, 1970  W. W. WOOD, JR  3,516,260
VIBRATING CABLE-LAYING PLOW
Filed Sept. 11, 1967  4 Sheets-Sheet 2

June 23, 1970  W. W. WOOD, JR  3,516,260
VIBRATING CABLE-LAYING PLOW
Filed Sept. 11, 1967  4 Sheets-Sheet 4

United States Patent Office 3,516,260
Patented June 23, 1970

3,516,260
VIBRATING CABLE-LAYING PLOW
William W. Wood, Jr., Denville, N.J., assignor to Bell Telephone Laboratories, Incorporated, Murray Hill and Berkeley Heights, N.J., a corporation of New York
Filed Sept. 11, 1967, Ser. No. 666,661
Int. Cl. F16l 1/00; B60g 9/00; B60k 17/00
U.S. Cl. 61—72.6                         20 Claims

ABSTRACT OF THE DISCLOSURE

A plow digs a slit trench and lays cable from the base of one structure directly to the base of another structure by using a longitudinally-vibrating plowshare whose end is suspended from the plow's center for pivotal fore and aft swinging movement. When the plow backs up to the starting structure, the share is swung back. As the plow moves forward, the share is swung down and held vertically. The share is swung forward when the front of the plow reaches the structure. Hydraulic means steer both the front and rear wheels to allow turning the vehicle about the share. Hydraulic means distribute power to the wheels to prevent slippage.

BACKGROUND OF THE INVENTION

This invention relates to plows for digging narrow slit trenches, and particularly to plows which release cables for burial in the trenches as they are dug.

At present, in cable-laying plows, tractive vehicles drag suitable plowshares that cut into the ground as they are pulled. In order to maximize the share's cutting effort, oscillating mechanisms vibrate the dragged plowshares. At the same time suitable cable-releasing apparatuses pass cable from a reel on the tractive vehicle into the thus-dug trench.

Such drawn plowshares offer the advantage that the drawbar connecting the share to the vehicle forms large moment arms which force the share in the ground. Also the vibration of the drawn share during the digging process can be easily isolated from both the driving vehicle or its operator by suitable loose couplings between the share and the tractive vehicle. However, such plows, while laying cable, can negotiate only large turns. Moreover, when the plow digs a trench from one building, terminal, or other structure, to another building, the digging operation must stop once the tractive vehicle reaches the terminal building. At that point, cable must be removed from the reel on the vehicle and the remaining distance either dug by hand or by backing the plow to the destination and digging the trench. Attempts to limit this remaining distance by decreasing the distance from the tractive vehicle to the share have increased the difficulty of holding the share in the ground.

THE INVENTION

These and other disadvantages of prior cable-laying plows are eliminated according to a feature of the invention by suspending a vibrating plowshare from the center of the tractive vehicle between the front and rear wheels and mounting it so as to permit fore and aft articulating movement thereof between the left and right wheels. By virtue of this feature, an operator can back the plow to a starting point and swing the share toward the starting point and then dig a trench. While advancing toward the destination, the operator swings the share into its vertical position, and upon reaching the destination, swings the share forward. Preferably the depths of the trenches at the starting and stopping points are determined by the length of the shares. Thus, if the share is short its lower end can emerge from the ground as it is swung forward just at the destination. On the other hand, longer shares can strike the destination below the surface of the ground.

According to another feature of the invention the plow in the vibrating mechanism is mounted from the articulating means which control the fore-and-aft position of the share through an intermediate vibration damper. Preferably the damper includes a plurality of parallel arms projecting resiliently from the articulating means, and resiliently holding the share and the vibrating mechanism at their ends. Preferably the vibrating movement is restricted to the longitudinal direction of the share by securing the vibrating mechanism and the share to the outside of respective sleeves which are secured on their insides to respective resilient cylinders, and by keying the ends of the arms to pins passing through the sleeves and secured to the resilient cylinder. Similar resilient cylinder means then mount the arms into other ends of the pivoting mechanism.

According to another feature of the invention cable is passed from a reel on the chassis of the tractive vehicle through the vibrating share in the longitudinal direction and out the bottom of the share through a radial opening.

Another feature of the invention involves hydraulic means for controlling the wheels so that if the front wheels turn to the right the rear wheels simultaneously turn to the left and the entire vehicle turns about the share. By virtue of this arrangement, tight corners may be dug so as to avoid obstruction and follow desired paths.

Still other features of the invention involve hydraulic means to compensate for the difference between terrain elevation traversed by the front wheels and rear wheels and for preventing slippage of one wheel before the other.

These and other features of the invention are pointed out in the claims, other objects and advantages of the invention will become apparent from the following detailed description when read in light of the accompanying drawings.

Figure 1:
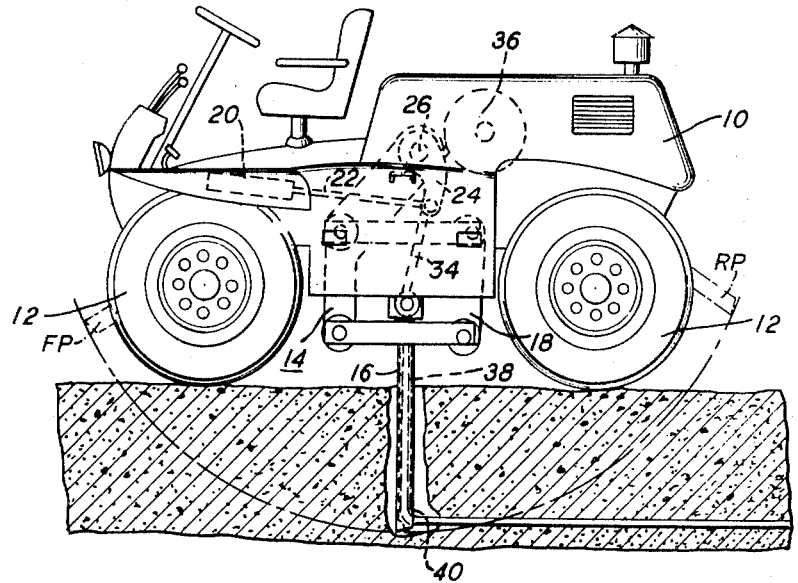
FIG. 1 is a side elevation of a plow embodying features of the invention.
Figure 3:
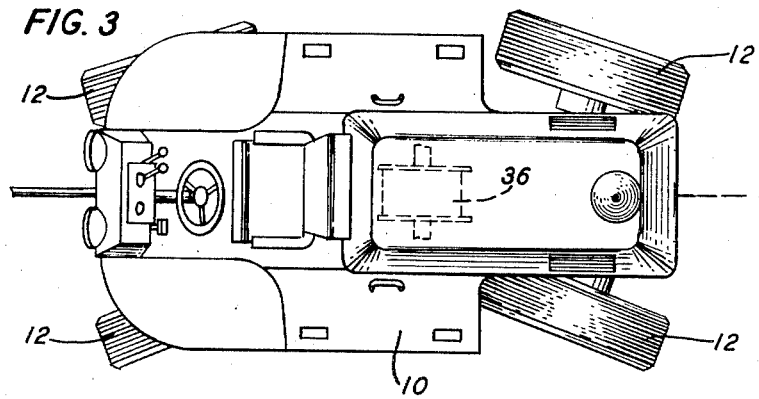
FIGS. 2 and 3 are front elevation and plan views of the plow in FIG. 1.
Figure 2:
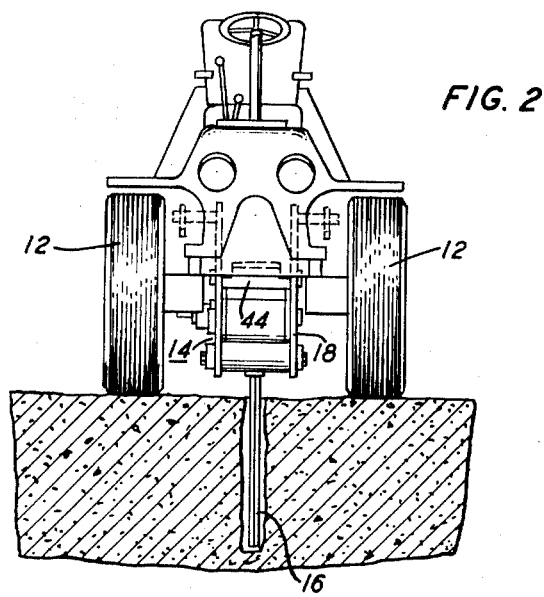

In the cable-laying plow of FIGS. 1, 2 and 3, a chassis 10 resting upon the axles of four wheels 12 supports a fore and aft swingable coupler 14. The latter holds a depending plowshare 16 and an oscillatory mechanism 18 for shaking the plowshare 16 approximately along its axis. A cylinder 20 attached to the chassis 10 controls a rod 22 which articulates a crank 24. A shaft 26 mounted in two bearings 28 on the chassis and keyed to both the crank 24 and the coupler 14, responds to the crank and rod 22 by swinging the coupler 14. The rod 22 can swing the coupler 14 and the depending plowshare 16 through an arc between the extreme rear position RP shown in phantom lines in FIG. 1 and an extreme forward position FP shown in phantom lines. A second cylinder 20', rod 22' and crank 24' on the other side of the plow coact with the ones shown to swing the share 16.

To cut a trench from a starting point such as a building or pedestal, a driver operating the plow in FIGS. 1, 2 and 3 first hydraulically actuates the cylinder 20 to swing the plowshare 16 through the ground into the rearmost position RP. He then backs the vehicle, by means of controls 30 near the driver's seat 32, to the starting point. He then energizes the oscillatory mechanism 18. When the plowshare 16 is vibrating axially he causes the cylinder 20 to swing the coupler 14 in bearings 28 so that the plowshare 16 moves down and forward into the ground toward the position shown in FIG. 1. When the plowshare achieves an almost-vertical but slightly raked-forward position, the driver starts moving the vehicle forward at a speed depending upon the character of the soil. At the completion of his run he stops his vehicle a few inches from the end point of the trench which may for example be a building. Again by energizing the cylinder CY he swings the coupler 14 and moves the vibrating plowshare 16 into its forward position FP. During his run the plow produces a slit trench such as that shown diagrammatically in FIG. 4.

While cutting the slit trench, cable 34 is automatically paid out from a reel 36 turnably mounted on the chassis 10. The cable 34 from the reel 36 passes through a feed tube 38 extending longitudinally through the plowshare and ending in a funnel 40 at the trailing end of the plowshare. The plow thus lays the cable in the ground directly behind the end of the plowshare. This is illustrated in more detail in FIG. 5.

The beginning of the cable being drawn from the turnable reel 36 is preferably connected directly, with some slack, to a cable termination at the starting point. At the completion of his run the driver releases some additional cable for connection to his other cable termination and cuts the cable. The driver now prepares for another run.

In order to accomplish this he first moves from his position with the plowshare in the forward position and, preferably at the starting point for new cable-laying procedures, swings the plowshare backward through the soil to its rearmost position. This places him in his new starting position.

Figure 5:
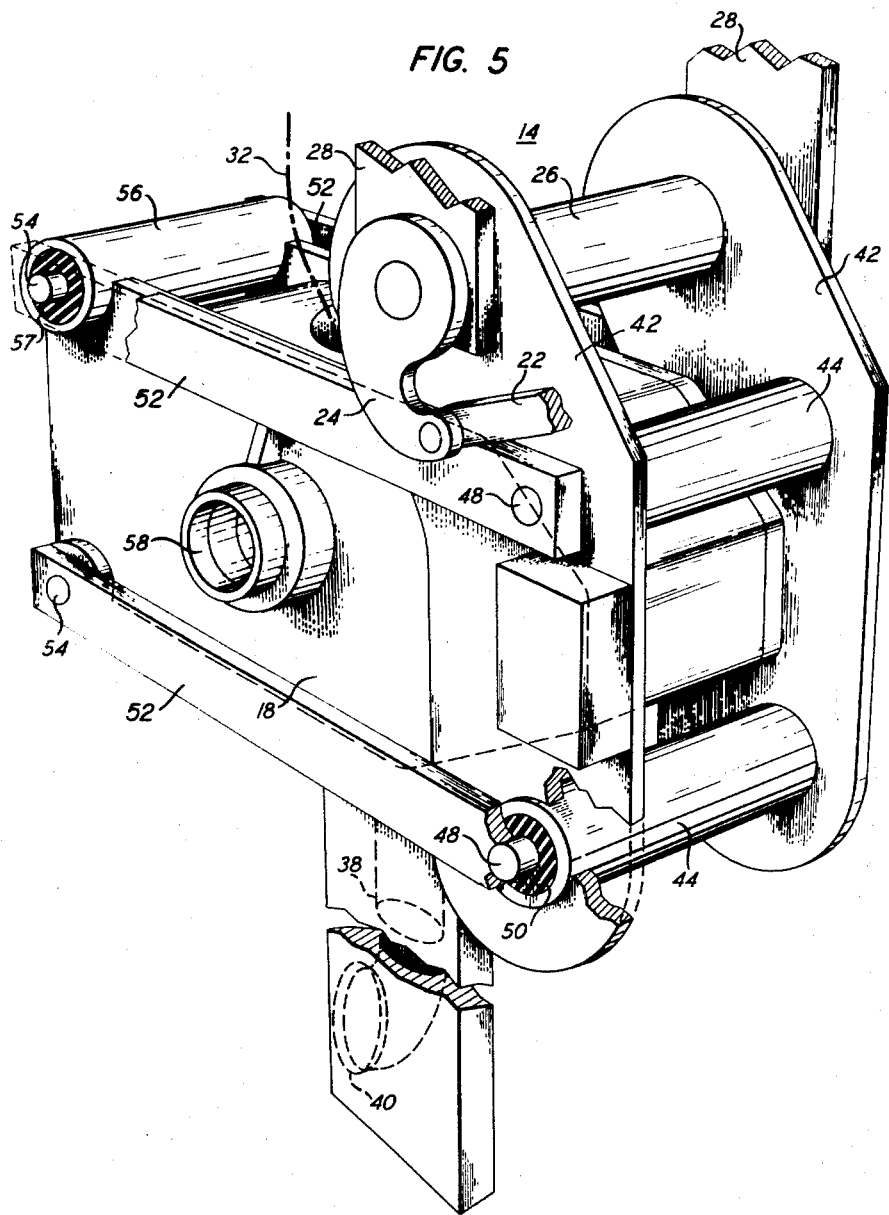
FIG. 5 is a perspective view illustrating the mounting of the share in FIG. 1 and the means for articulating it.

Details of the coupler 14, its mounting, the vibrating mechanism 18 and the plowshare 16, appear in FIG. 5. Forming the coupler 14 are two side plates 42 shaped like the ends of hockey sticks. Steel tubes 44 and the shaft 26 welded to the side plates 42 secure the plates in position. The shaft 26 extends outwardly beyond the side plates through bearings 28, and terminates in the cranks 24 to which it is keyed. When actuated by the rods 22 the cranks 24 swing the entire coupler 14 in the bearings 28.

Supporting a pair of pins 48 in the centers of the tubes 44 are two pairs of cylindrical rubber inserts 50 inside the tubes near their respective ends. These are bonded to both the tubes 44 and the pins 48. Thus, the pins can rotate only within the flexural limits imposed by the inserts 50. Both ends of the pins 48 project rotatably through holes in the plates 42. Four arms 52 are force-fitted onto both ends of the pins 48 so as to be cantilevered there. The inserts 50 support pins 48 and hold the arms 52 in parallel positions. However, the inserts furnish some torsional flexure to allow limited articulating movement of the arms.

The outer ends of the arms 52 support the end of the oscillatory mechanism 18 by the ends of outer pins 54. These pins 54 correspond to the pins 48 and are force-fitted onto the ends of the arms 52. They project from tubes 56, corresponding to the tubes 44 and welded to the vibrating mechanism 18. The pins 54 are also held by surrounding cylindrical inserts 57 bonded throughout their length to both the tubes and pins. In any position the weight of the oscillatory mechanism 18 slightly draws down the ends of the arms 52 until the torsional reaction of the inserts 50 and 57 upon the pins 48 and 54 prevents further articulation and establishes an equilibrium position for the oscillatory mechanism 18 and the plowshare 16 connected thereto. As the oscillator mechanism 18 vibrates it moves about this elastically constrained equilibrium position. The arms, because they are held parallel, maintain the mechanism 18 in a substantially constant attitude relative to the coupler 14.

The oscillatory mechanism 18 is of a conventional type composed of a pair of counter-rotating eccentric weights which tend to maintain the vibrations transverse to the arms 52 and limit vibrations along the arms and along the pins 48 and 54. Vibrations along the arms and along the pins are balanced out. The plowshare 16 inclines downwardly and slightly forward relative to the vibrating direction. When the coupler 14 sets the vibrations to be vertical, this furnishes a lifting component to the soil. A hydraulic motor 58 turns the counter-rotating weights in the oscillatory mechanism 18 to produce the linear vibrations.

Passing between the counter-rotating weights from the top of the housing on the vibrating mechanism is the feed tube 38 that passes ultimately through the plowshare 16. The feed tube 38 receives the cable 34, as shown by the dashed-dot line, from the reel 36 located off to one side above the oscillatory mechanism 18.

In operation the rods 22 pivot the shaft 26 and coupler 14 that includes the side plates 42 about the bearings 28 so as to shift the position of the coupler. The latter carries with it the oscillatory mechanism 18 as well as the plowshare 16 which is secured to the bottom of the oscillatory mechanism. The weight of the vibrating mechanism pulls down on the ends of the arms 52 and produces a torque upon the pins 48 as well as the pins 54. The oscillatory mechanism 18 vibrates from energy supplied by the hydraulic motors 58. During vibration the torsonal strain placed upon the inserts 50 and 57 increases and decreases while allowing the oscillatory mechanism 18 as well as the plowshare 16 to vibrate about its equilibrium position.

Figure 4:
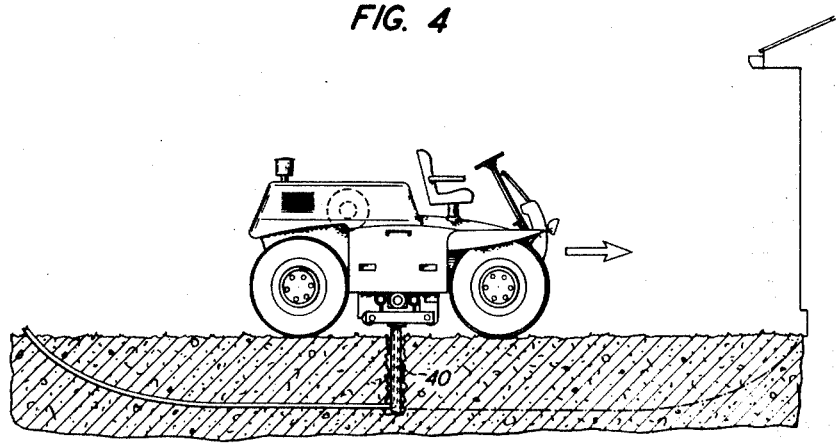
FIG. 4 is a side elevation illustrating the manner in which the plow of FIG. 1 lays cable as it approaches a building.

In the operating position shown in FIG. 4, when the plowshare 16 is rigged slightly forward relative to the vibrating direction of the mechanism 18 and the chassis 10, the vibrations are vertical. The arms 52 are then substantially horizontal. The horizontal arms then provide a rigid transmission of horizontal forces from the chassis 10 to the plowshare 16. On the other hand, vertical forces applied by the mechanism 18 are isolated from the chassis of the plow. The arms prevent rotational motion of the plowshare.

Figure 6:
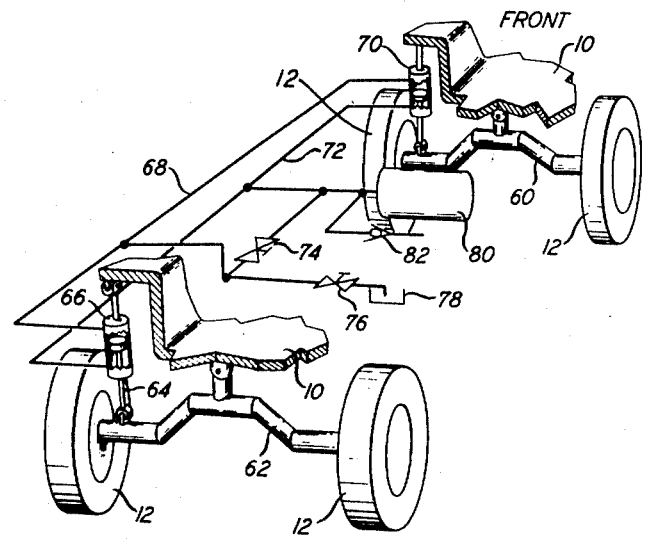
FIG. 6 is a partly perspective, partly schematic view of the hydraulic system for distributing the response of the wheels to changes in elevation of the terrain traversed by the plow in FIG. 1.

In the plow of FIGS. 1 to 5 it is important to limit the tilting of the chassis 10 from side to side so as to limit the lateral bending forces imparted to the share 16 when it projects into the ground. Some tilting is permissible. This is so because the resiliently held arms 52 can absorb some of the forces produced by tilting. It is also desirable to limit the clearance needed between the wheels and the chassis 10. Since the plow must traverse variable terrain, bumps may tend to tilt the chassis of the usual fixed rear axle suspension as used and may also cause the wheels to hit the chassis. Thus, the suspension illustrated diagrammatically in FIG. 6 is used in the apparatus of FIGS. 1 to 5. Here, the axle 60 for the front wheels 12 and the axle 62 for the rear wheels 12 are mounted at their centers to the chassis 10 for pivotal movement about an axis along the plow's length. In the usual vehicle with a pivotally fixed rear axle, an upward force applied to the rear left wheel due to a bump in the terrain traversed by the plow normally tilts the chassis violently. However in FIG. 6 the bump on the rear left wheel forces a rod 64 upwardly into a cylinder 66 depending from the front of the chassis and filled with oil on both sides of the piston. The chassis lifts only slightly. The rising piston also forces oil through a line 68 into the top chamber of a cylinder 70 which is also filled with oil on both sides of an interior movable piston. The cylinder 70 depends from the rear of the chassis 10. The oil flow increases the pressure in the top chamber of cylinder 70 and lifts the chassis on the left side in the front also. At the same time, the flow depresses the piston in the cylinder 70 and forces flow of oil to a line 72 back to the bottom of the cylinder 66. As a result, the rod 64 is aided as it enters the cylinder 66 and pivots the axle 62 clockwise relative to the chassis. At the same time the flow pivots the axle 60 in the other direction relative to the chassis. Since the front wheels are on a level plane, the front of the chassis is tilted up slightly on the left. The rear of the chassis tilts up equally on the left but only one half as much as in a fixed rear axle plow. As a result any bending forces by the chassis on the share in the ground is reduced. The smaller bending forces are absorbed by the arms 52 and the inserts 57.

This system of oil flow also prevents the chassis from assuming a tilting position on level ground. A valve 74 between lines 68 and 72 establishes the amount of fluid in the system connected to line 68 and in the system connected to the line 72. This establishes a particular position for the chassis relative to the axles. Further control of this type is furnished by a bleeding valve 76 from the line 72 passing oil to the dump 78. Generally to tilt the vehicle to the left, valve 76 should be opened. To tilt the vehicle to the right, valve 74 should be opened. An accumulator 80 maintains the system under positive pressure at all times. A source of supply 82 recharges the system as necessary.

In the plow of FIGS. 1 to 4, the vehicle turns about the point where the plow is in the ground. The steering mechanism for the plow is diagrammatically shown in FIG. 7. Here, by turning the wheel 84 to the left a steering line 86 receiving fluid from a hydraulic valve 88 at the end of the steering column 90 passes oil into the rod side of a piston in a cylinder 92 at the rear of the plow. The other side of the cylinder 92 connects to a beam 93 on the chassis 10. This draws the rod 94 into the cylinder and articulates the wheel 12 at the rear right of the vehicle about its kingpin 96 on the rear axle 62 through a control link 100. Links 102 transmit the articulating motion of the rear right wheel to the rear left wheel 12 about the other kingpin 104 on the rear axle 62. The rear wheels then assume the positions shown in broken lines. The geometry of these links 100 and 102 is such that the inside wheels turn about a smaller diameter than the outside wheels. The rod 94 and piston forces oil from the chassis end of the cylinder 92 through a line 104 to the side of a piston in a cylinder 106 that is coupled to the beam 93 on the front of the chassis 10. This forces a rod 108 outwardly from the cylinder 106 and by means of control links 110 swings the wheels 12 at the front of the vehicle about the kingpins on the front axle 60 so as to turn the wheel to the left. Again, here, the wheel on the inner part of the circle is turned by the geometry of the connecting links 112 to follow a shorter radius than the outside wheels. The front wheels then assume the position shown in broken lines.

A line 114 passing through a normally open valve 116 returns the fluid back to the hydraulic valve 88. Turning the control wheel to the right the flow of oil is reversed and the direction of turning the wheels is also reversed. A valve 118 by bleeding oil from the chassis ends of cyinders 92 and 106 trims the wheels 12 toward the right so the vehicle does not move sideways toward the left. Valve 120 between the lines 116 and 104 permits adding oil to the line 104, thereby trimming the wheels to the left to prevent the vehicle from moving sideways to the right.

The valve 116 when closed permits the valves 118 and 120 to trim the rear wheels relative to the front wheels.

Figure 7:
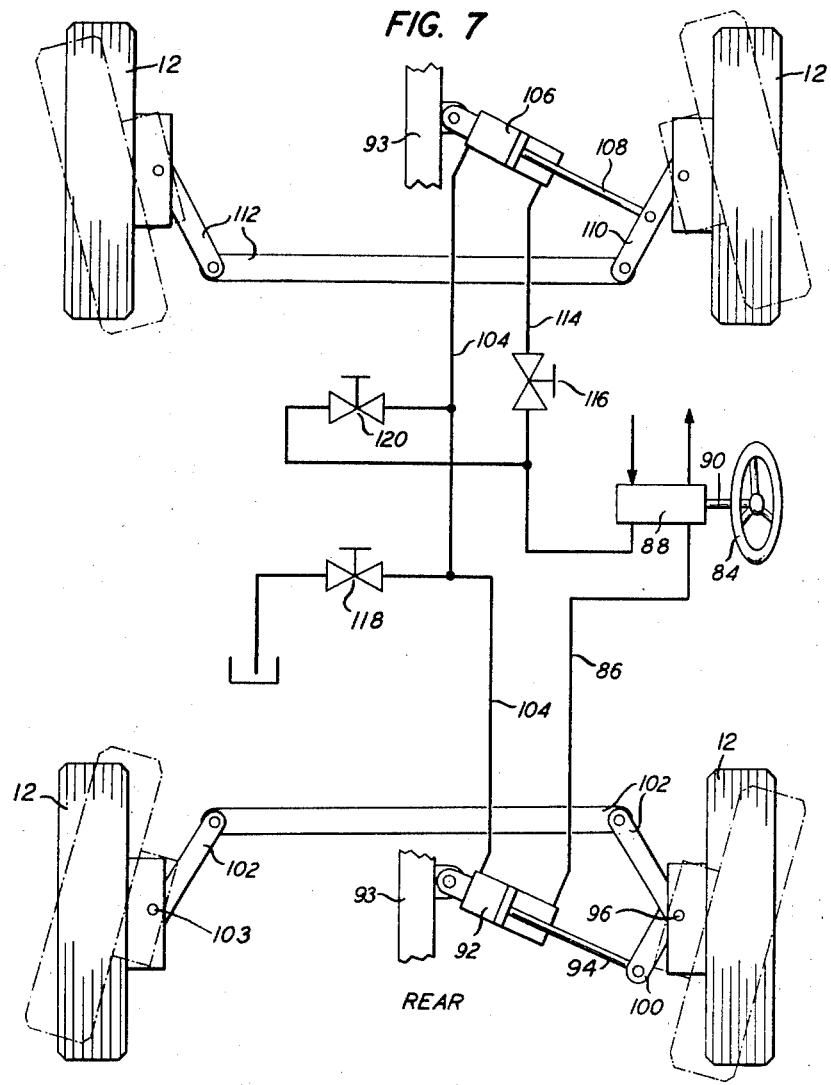
FIG. 7 is a partly plan, partly schematic view of the wheel control mechanism of the plow in FIG. 1.

By virtue of the two hydraulic systems, namely those illustrated in FIGS. 6 and 7, the lateral forces which the soil and the vehicle both tend to place upon the share vibrating within the soil is limited to those which can be absorbed by the resilient portions supporting the arms 52 and by the structure of the share itself. The system of FIG. 6 limits the tilting action of the chassis even in comparatively uneven terrain. On the other hand, by assuring that the vehicle pivots about the share, the steering system of FIG. 7 limits the forces which the combination of the vehicle and the soil would place upon the share during the turn.

Plows for laying telephone cables dig into and traverse various types of soil under all types of weather conditions. The soils include both wilderness terrain and smoothly cultivated lawns. Under all these conditions wheels can slip while the plow bears the burden of pushing the plowshare forward. Slipping wheels cannot only tear up carefully tended lawns, but also impair the effectiveness of the plow. One slipping wheel drastically reduces the total tractive effort of the plow. This is so even when the other wheels are gripping firmly. According to the invention the problem of slipping wheels is reduced by driving each wheel with a hydrostatic motor and subjecting each of the hydrostatic motors at each wheel to equal fluid flows. By virtue of this feature, any tendency on the part of one wheel to slip and draw a greater fluid flow at once creates greater flow in the motors of the other wheels and increases the tractive effort or torque on their parts.

Figure 8:
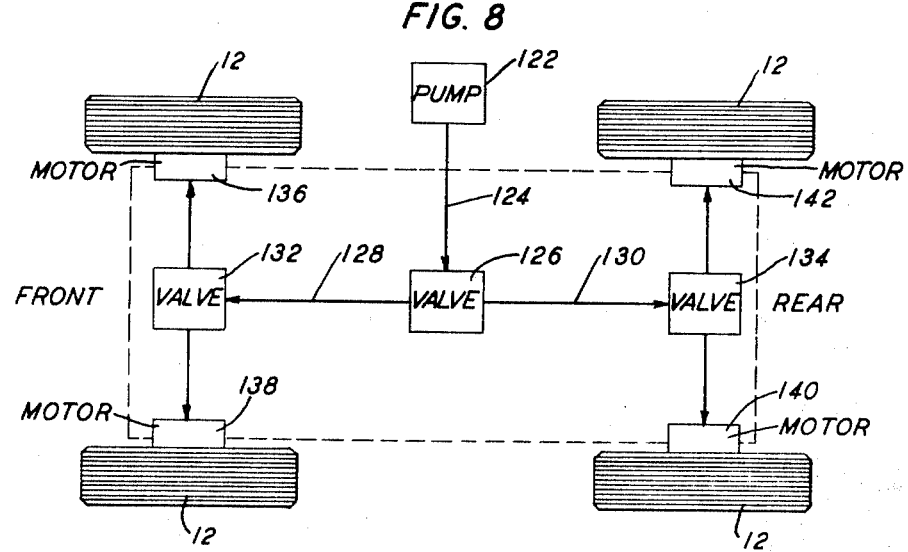
FIG. 8 is a perspective view of the hydraulic drive mechanism for the plow in FIG. 1.

The system for accomplishing this appears in FIG. 8. Here, the hydraulic pump 122 driven by the engine of the plow drives hydraulic fluid through an input line 124 to a flow divider valve 126. The valve 126 divides the flow to two output lines 128 and 130 that emerge therefrom so that they each carry fluid at the same rate. Two substantially identical flow divider valves 132 and 140 receive the fluid from the lines 128 and 130, respectively. They again divide the fluid so that equal flows appear in hydraulic motors 136, 138, 140 and 142 which are each coupled mechanically to the wheels 12 for driving them.

Figure 9:
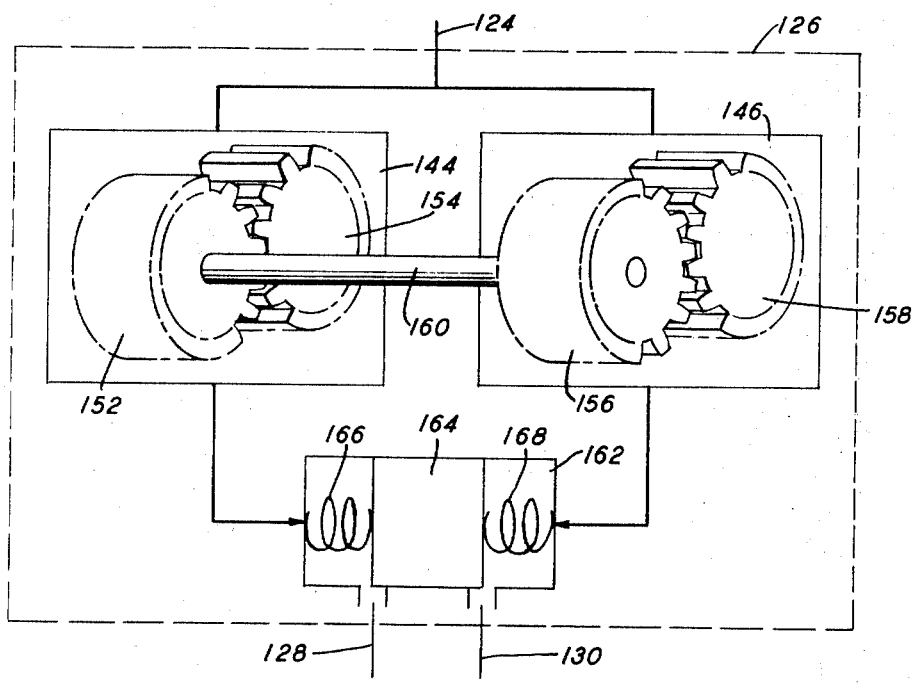
FIG. 9 is a detail of the flow-dividing devices of the mechanism in FIG. 8.

Details of the flow-dividing valve 126 appear in FIG. 9. These details are shown for the valve 126 but also apply to the valve 132 and the valve 134. In FIG. 9 the input line 124 feeds fluid to two sets of coupled gear meters 144 and 146. The meters 144 and 146 correspond substantially to two conventional gear motors or gear pumps. In the meters 144 suitable bearings hold two engaged gears 152 and 154 for idler rotation. The gear 152 is coupled by a shaft to a gear 156 in the meter 146. The gear 156 engages a gear 158 and is sealed in the housing 150. The gears 156 and 158 are mounted for idler rotation with the exception of the coupling shaft 160 to which the gear 156 is keyed. Fluid flow emerging from the meter passes through respective ends of a control valve cylinder 162 from which it emerges at the lines 128 and 130. The control valve cylinder 162 forms part of the control valve 126. It includes a control piston 164 which is biased toward the center of the cylinder 162 by means of springs 166 and 168. At its central position, the piston covers half of each of the ports at which lines 128 and 130 enter. When the piston 164 moves left it uncovers more of the port to line 130 and increases the flow therethrough. At the same time, it covers more of the port to the line 128, thereby reducing the flow therethrough. Thus, flow through the input line 124 passes through the two metering gears 144 and 146 and the ends of the control valve cylinder 162 before emerging at the output lines 128 and 130. The flow divider valves 132 and 134 are identical to the valve 126 shown in FIG. 9.

The valve 126 equalizes the flow in the output lines 128 and 130. If the flow in the output line 128 were greater than the flow to the output line 130 to any degree the faster flow in the meter 144 would drive the shaft 160 in the manner of an hydraulic motor. The shaft 160 would in turn drive the meter 146 like the hydraulic pump. This draws more fluid from the line 124 and increases the pressure at the right-hand side inside the control valve cylinder 162. This pressure drives the control piston 164 to the left thereby reducing the flow out of the output line 128 and increasing the corresponding flow out of the output line 130. This is so because the piston 164 as it moves back and forth opens and closes the openings in the cylinder 162 to the lines 128 and 130 over an infinite number of positions.

In operation the valves 126 and 132 as well as 134 perform in FIG. 8 as follows: Assuming first that the forward wheels 12 each encounted the same type of soil, and the rear wheels encounter the same type of soil but different from that encountered by the front wheels. If the rear wheels, because they encounter a looser type of soil or because the weight normal to the ground is less than the front wheels, begin to slip or move even slightly faster than the front wheels, the flow of oil to the rear wheels beings to increase slightly. This slight increase in the line 130 causes the meter 146 to drive the meter 144 and increase the pressure in the left-hand side of the control valve cylinder 162. This pushes the control piston 164 to the right. This rightward movement causes the piston 164 to cover more of the opening in the cylinder 162 to the line 130. At the same time it causes the cylinder to open more of the port in the cylinder 162 at the line 128. This decreases the flow through the line 130 and increases it to the line 128 until the flows are equal. This reduction of flow slows the rear wheels while decreasing the torque applied by the rear wheels to the soil. It also increases the flow to the front wheels and increases their torque. They thus pull the vehicle and the rear wheels. Thus, the rear wheels overcome their tendency to slip. The valves 132 and 134 similarly restrict any tendency on the part of the right and left wheels both front and back of the vehicle to slip in the same manner.

The invention affords a powerful versatile plow capable of laying cable directly from one building to another over a variety of soils and terrains. The plow can lay cable along any route despite the tightness of curvature required over the route. Moreover, complete effectiveness of the tractive forces applied by the wheels is available despite the changes in the characters of the soils.

While an embodiment of the invention has been described in detail, it will be obvious to those skilled in the art that the invention may be embodied otherwise without departing from its spirit and scope.

What is claimed is:

1. A plow comprising a chassis, having a front and rear tractive means supporting said chassis, engine means mounted on said chassis for applying driving power to said tractive means and thereby driving said chassis by means of said tractive means, a plowshare, vibrating means for vibrating said plowshare, supporting means for holding said vibrating means and suspending said plowshare from said chassis near the center of said chassis between said front and rear; articulating means for pivoting said supporting means and said vibrating means and said plowshare between positions in which said plowshare extends out of the soil toward the forward end of said chassis, in which said plowshare extends into the soil under said chassis, and in which said plowshare extends out of the soil toward the rear of said chassis; and control means for controlling the pivotal position of said plowshare.

2. A plow as in claim 1 wherein said plowshare defines a longitudinal opening terminating at the end of the plowshare away from said supporting means in an axial opening, and means on said chassis for holding cable and guiding cable through the opening in said plowshare toward the end of said plowshare whereby said plow can lay cable while said plowshare cuts through ground.

3. A plow as in claim 1, wherein said tractive means include two front wheels and two rear wheels supporting said chassis.

4. A plow as in claim 3 wherein said supporting means comprise a plurality of parallel arms each resiliently mounted at one end on said articulating means, said parallel arm resiliently holding said share at their other ends.

5. A plow as in claim 3, wherein said supporting means comprise a plurality of parallel arms each resiliently mounted at one end on said articulating means, said parallel arms resiliently holding said share at their other ends.

6. A plow as in claim 3 wherein said front and rear wheels support said chassis on respective axles, said axles being pivotally secured for articulation in a vertical plane to said chassis at their respective centers, and hydraulic means connected for transmitting pivotal movement of one axle in the vertical plane to the other axle.

7. A plow as in claim 6 wherein said means for transmitting the articulating force between said axles include a pair of cylinder means each having piston means and each connected between one of said axles at respective ends near one of said wheels and said chassis and a plurality of hydraulic lines for passing fluid from behind the piston means in one of said cylinder means to behind the piston means in the other of said cylinder means and for passing fluid from in front of said piston means in one of said cylinder means to in front of said piston means in the other of said cylinder means.

8. A plow as in claim 7, wherein said supporting means comprises a plurality of parallel arms each resiliently mounted at one end on said articulating means, said parallel arms resiliently holding said share at their other ends.

9. A plow as in claim 1 wherein said vibrating means include motor means and a pair of counter-rotating weights operatively connected to said motor means for moving in unison in one and the other directions.

10. A plow as in claim 4, wherein said vibrating means include motor means and a pair of counter-rotating weights operatively connected to said motor means for moving in unison in one and the other directions.

11. A plow as in claim 4 wherein said support means include a housing holding said vibrating means and said share, said housing being mounted at the end of said arms away from said articulating means.

12. A plow as in claim 5, wherein said front and rear wheels support said chassis on respective axles, said axles being pivotally secured for articulation in a vertical plane to said chassis at their respective centers, and hydraulic means connected for transmitting pivotal movement of one axle in the vertical plane to the other axle.

13. A plow as in claim 3, wherein kingpin means render each of said wheels turnable about respective vertical axes, wherein link means control said front wheels and said rear wheels respectively to turn with each other, and wherein hydraulic means constrain said rear wheels to face in one direction when said front wheels are turned to face in the other direction, said hydraulic means including a power steering control.

14. A plow as in claim 13, wherein said means for transmitting the articulating force between said axles include a pair of cylinder means each having piston means and each connected between one of said axles at respective ends near one of said wheels and said chassis and a plurality of hydraulic lines for passing fluid from behind the piston means in one of said cylinder means to behind the piston means in the other of said cylinder means and for passing fluid from in front of said piston means in one of said cylinder means to in front of said piston means in the other of said cylinder means.

15. A plow as in claim 14, wherein said supporting means comprises a plurality of parallel arms each resiliently mounted at one end on said articulating means, said parallel arms resiliently holding said share at their other ends.

16. A plow as in claim 13 wherein said hydraulic means include respective cylinder means connected between said chassis and said linking means in said front and rear wheels respectively and fluid means interconnecting said cylinder means and said power steering control for applying pressures to said cylinder means that will cause said front wheels to pivot in opposite circular directions about said kingpin means.

17. A plow as in claim 3, wherein said means for transmitting the articulating force between said axles include a pair of cylinder means each having piston means and each connected between one of said axles at respective ends near one of said wheels and said chassis and a plurality of hydraulic lines for passing fluid from behind the piston means in one of said cylinder means to behind the piston means in the other of said cylinder means and for passing fluid from in front of said piston means in one of said cylinder means to in front of said piston means in the other of said cylinder means.

18. A plow as in claim 3 wherein separate hydraulic motor means drive each of said wheels, a source of fluid under pressure, and wherein fluid-dividing means distribute equal fluid flows from said source to said respective hydraulic motor means, such that the total power is distributed so that said wheels encountering a greater resistance receive more fluid.

19. A plow as in claim 4, wherein separate hydraulic motor means drive each of said wheels, a source of fluid under pressure, and wherein fluid-dividing means distribute equal fluid flows from said source to said respective hydraulic motor means, such that the total power is distributed so that said wheels encountering a greater resistance receive more fluid.

20. A plow as in claim 17, wherein separate hydraulic motor means drive each of said wheels, a source of fluid under pressure, and wherein fluid-dividing means distribute equal fluid flows from said source to said respective hydraulic motor means, such that the total power is distributed so that said wheels encountering a greater resistance receive more fluid, wherein said plowshare extends between said front wheels when said plowshare extends forward, and wherein said plow extends between said rear wheels when said plow extends to the rear of the chassis.

References Cited

UNITED STATES PATENTS

| | | | |
|---|---|---|---|
| 2,684,254 | 7/1954 | Goss | 280—6 X |
| 2,905,253 | 9/1959 | Ditter | 61/72.6 X |
| 3,328,019 | 6/1967 | Wilson | 280—6 X |
| 3,390,533 | 7/1968 | Gremillion | 61—72.6 |
| 3,417,571 | 12/1968 | Kelley | 61—72.6 |
| 3,425,232 | 2/1969 | Bodine | 61—72.6 |
| 3,431,741 | 3/1969 | Kinnan | 61—72.6 |

JACOB SHAPIRO, Primary Examiner

U.S. Cl. X.R.

172—40; 180—45, 79.2, 41, 66; 280—6